(12) United States Patent
Brambilla

(10) Patent No.: US 10,295,326 B2
(45) Date of Patent: May 21, 2019

(54) DEVICE AND METHOD FOR MEASURING A VALVE SEAT FORMED IN A PIECE

(71) Applicant: Marposs Societa' Per Azioni, Bentivoglio (IT)

(72) Inventor: Daniele Pasqualino Brambilla, Bernareggio (IT)

(73) Assignee: Marposs Società Per Azioni, Bentivoglio (IT)

( * ) Notice: Subject to any disclaimer, the term of this patent is extended or adjusted under 35 U.S.C. 154(b) by 185 days.

(21) Appl. No.: 15/544,190

(22) PCT Filed: Jan. 18, 2016

(86) PCT No.: PCT/EP2016/050918
§ 371 (c)(1),
(2) Date: Jul. 17, 2017

(87) PCT Pub. No.: WO2016/116411
PCT Pub. Date: Jul. 28, 2016

(65) Prior Publication Data
US 2018/0010898 A1   Jan. 11, 2018

(30) Foreign Application Priority Data

Jan. 19, 2015 (IT) .............................. BO2015A0018

(51) Int. Cl.
*G01B 5/00* (2006.01)
*G01B 5/20* (2006.01)
(Continued)

(52) U.S. Cl.
CPC ........ *G01B 5/0032* (2013.01); *F16K 37/0041* (2013.01); *G01B 5/20* (2013.01); *G01B 5/201* (2013.01); *G01B 5/241* (2013.01)

(58) Field of Classification Search
CPC ...... G01B 5/0032; G01B 5/201; G01B 5/241; G01B 5/20; F16K 37/0041
See application file for complete search history.

(56) References Cited

U.S. PATENT DOCUMENTS 4,545,706 A * 10/1985 Hiroyasu ................ B23C 3/055
                                                                408/1 BD
5,302,057 A *  4/1994 Siegfried ................ B23C 3/055
                                                                408/1 R
(Continued)

FOREIGN PATENT DOCUMENTS

DE              137 970 A1   10/1979
DE          101 21 964 A1   11/2002
(Continued)

*Primary Examiner* — Freddie Kirkland, III
(74) *Attorney, Agent, or Firm* — Blank Rome LLP

(57) ABSTRACT

A device (1) for measuring a valve seat formed in a piece has an elongate shape and defines a longitudinal axis (A), and includes: a slide (9), slidingly coupled to a guide (11) for translating in a scanning direction (B) inclined to the longitudinal axis; a sensor (10), mounted on the slide for measuring a parameter relating to a profile of the seat; a processing unit connected to the sensor; a rotary actuator (13) defining a longitudinal rotation axis substantially parallel to the longitudinal axis of the device; and a transmission assembly interposed between the rotary actuator and the slide for transforming a rotary motion about a longitudinal rotation axis in a reciprocating linear motion of the slide along the scanning direction.

15 Claims, 14 Drawing Sheets

(51) Int. Cl.
*G01B 5/24* (2006.01)
*F16K 37/00* (2006.01)

(56) References Cited

U.S. PATENT DOCUMENTS

| | | |
|---|---|---|
| 5,533,384 A | 7/1996 | Pierce et al. |
| 6,386,024 B1 | 5/2002 | Marck et al. |
| 7,104,121 B2 * | 9/2006 | Firmin ................... G01B 5/003 73/114.79 |
| 9,689,655 B2 * | 6/2017 | Grzesiak ................ G01B 5/008 |
| 9,863,750 B2 * | 1/2018 | Brambilla ................ F01L 1/46 |
| 2011/0184695 A1 | 7/2011 | Grzesiak |

FOREIGN PATENT DOCUMENTS

| | | |
|---|---|---|
| DE | 101 21 964 B4 | 5/2011 |
| EP | 2 330 378 A1 | 6/2011 |
| JP | 11 81935 A | 3/1999 |

* cited by examiner

FIG.2
FIG.2a
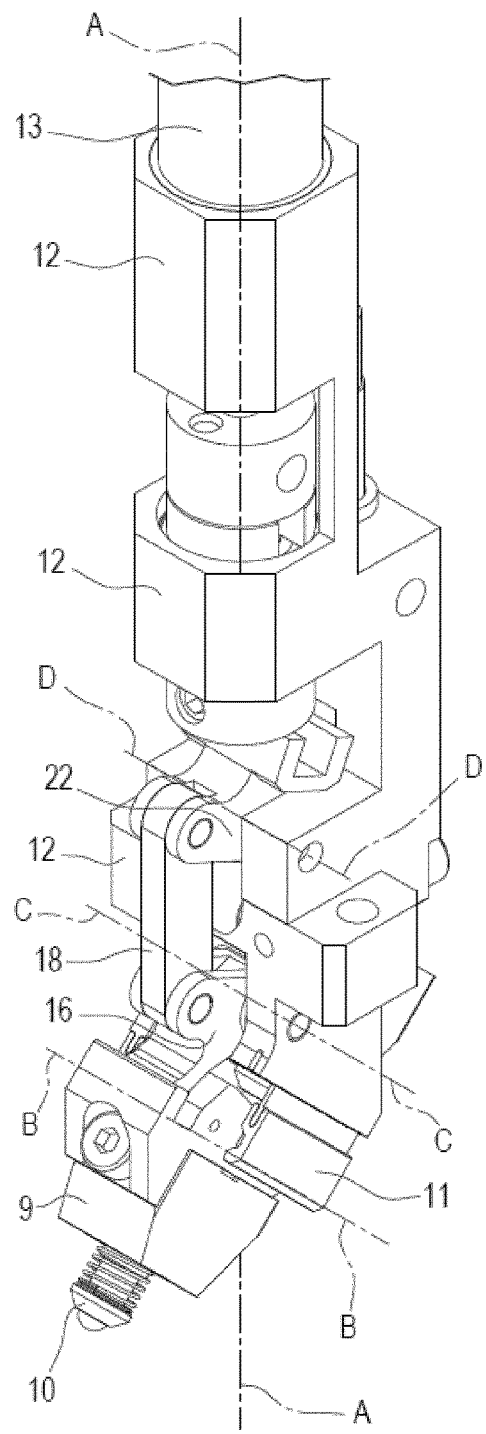
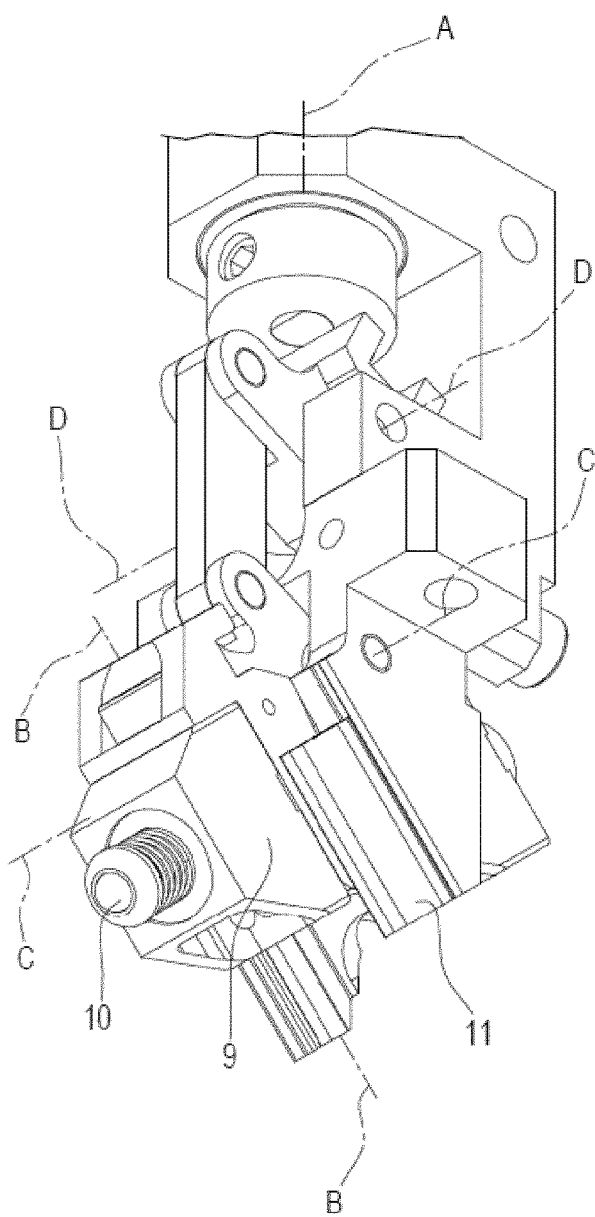

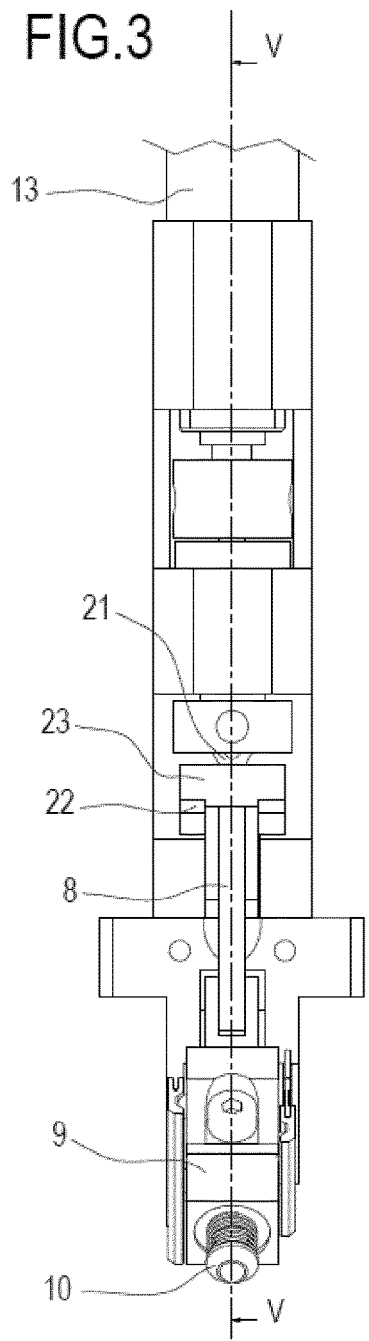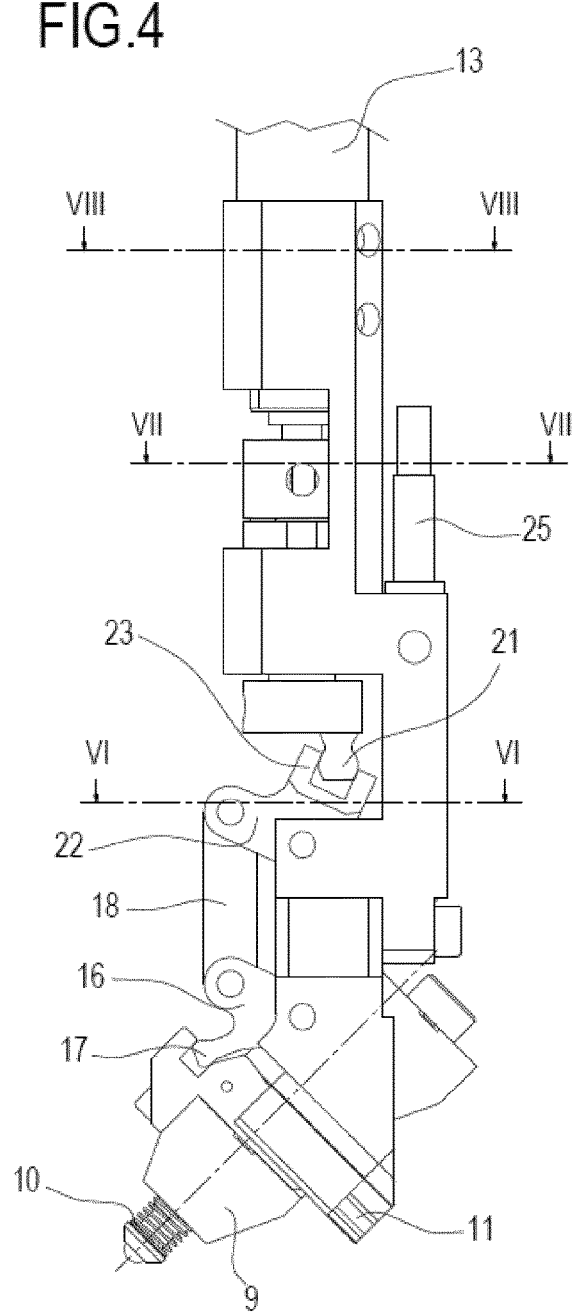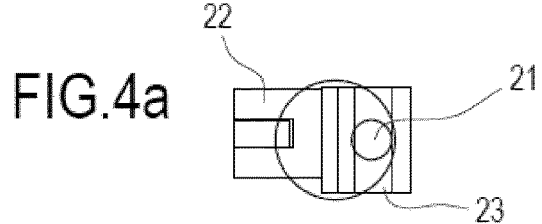

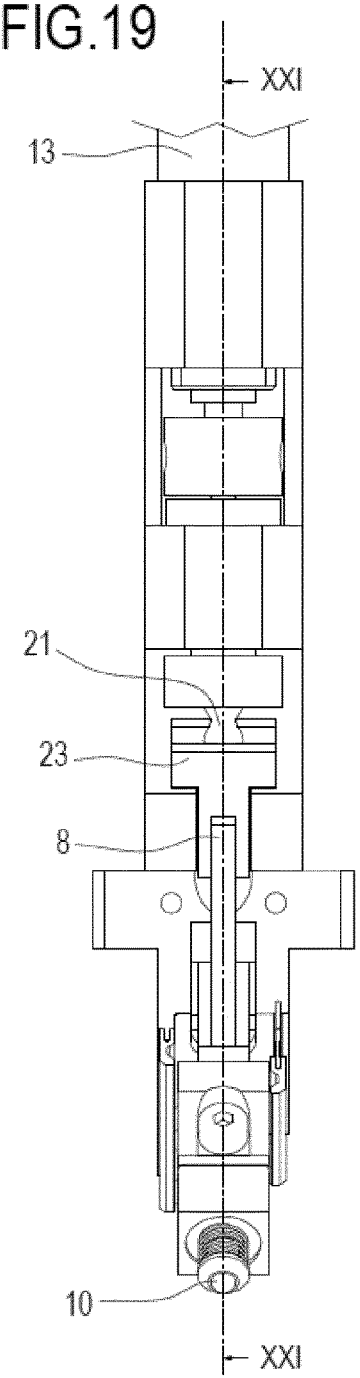
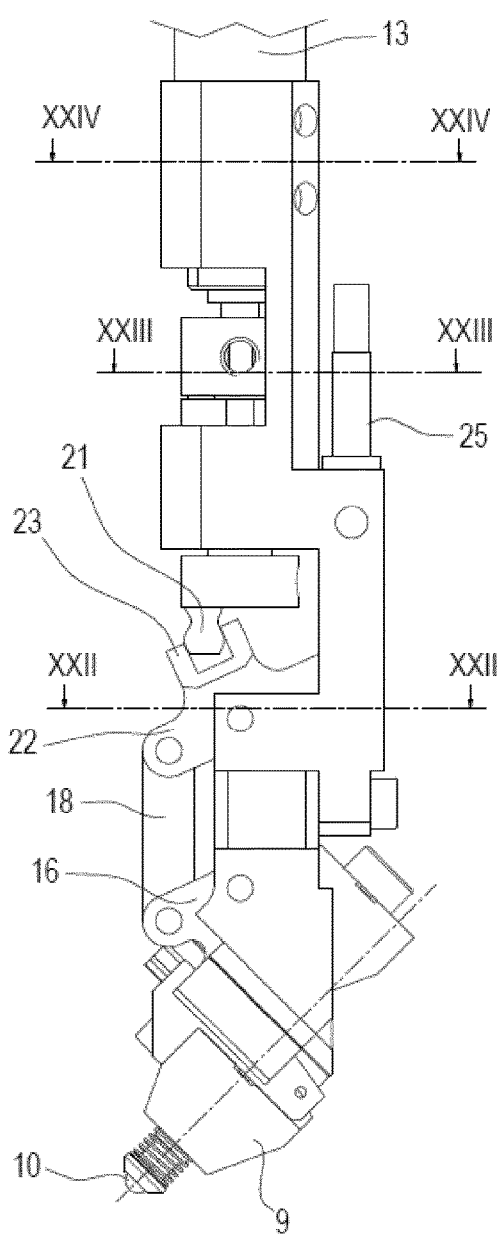
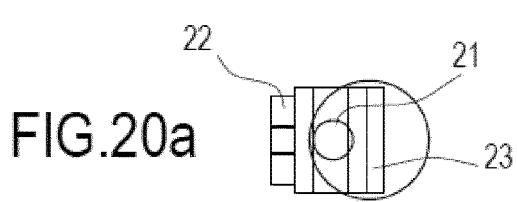

DEVICE AND METHOD FOR MEASURING A VALVE SEAT FORMED IN A PIECE

TECHNICAL FIELD

The present invention refers to a device and a method for measuring a valve seat formed in a piece. In general, the invention relates to a device and a method for measuring a profile of a seat formed in a piece. In particular, the device and the method according to the invention are targeted to measure a tapered portion of the seat located at the mouth of the seat. The invention applies in particular, but not exclusively, to the measurement of the valve seat of an internal combustion engine, formed in the cylinder head. Such valve seat defines a seat axis, more specifically the valve seat has a guide hole, defining such seat axis, and the tapered portion is inclined at an angle (for example 45 degrees) with respect to the seat axis. Some parameters of the tapered portion of the seat, are to be measured, in particular parameters related to the inclination angle of the tapered portion (with respect to the guide hole and to the surfaces adjacent to the tapered portion, which have different taper), to the straightness of the tapered portion and to its length, as well as to an oscillation of the profile of the tapered portion (runout) and to the roundness of the tapered portion.

BACKGROUND ART

In the field of precision measuring instruments, devices are known for measuring said valve seats, for example from patent documents U.S. Pat. No. 5,533,384A, DD137970, EP2330378A1 and DE10121964B4. Such devices have an elongate shape defining a longitudinal axis, that is a shape that is elongated along such longitudinal axis, so as to be arranged to properly cooperate with the seat to be measured and are equipped with a sensor adapted to detect the profile of the tapered portion of the valve seat. In order to be able to scan the tapered portion of the valve seat in its length, the sensor must be able to radially move, for cooperating with areas of the tapered portion positioned at different distances from the seat axis. In this respect, the solution proposed by EP2330378A1 provides that the sensor is mounted on an oscillating element. However, this solution has the limitation of being not always sufficiently precise and reliable in terms of repeatability in the measurement and robustness. According to the solution described in DE10121964B4, the sensor is mounted on a slide movable along a guide, the latter being arranged parallel to the surface of the valve seat to be measured. The slide is moved by a motor having its axis of rotation aligned with the guide. Therefore, the device of DE10121964B4 has a portion that protrudes and is inclined, for example of an angle of 45 degrees, with respect to the longitudinal axis of the device. The slide with the respective sensor and the motor responsible for moving the slide are housed in the protruding and inclined portion. This solution has the disadvantage of making the device bulky. In particular, a ending portion of the device, at which the sensor is arranged, has a relatively large radial dimension that prevents the device to be used in particular operating conditions, for example, where the cylinder head including the valve seat to be measured is mounted on a support which defines a narrow passage, through which the device should be introduced to reach the valve seat.

DISCLOSURE OF THE INVENTION

The object of the present invention is to get a device and a method for measuring a valve seat formed in a piece, which overcome the drawbacks of the above-cited prior art. In particular, it is an object of the present invention to provide a device and a method for measuring a valve seat formed in a piece which ensure high accuracy and allow to perform the measurement even in conditions of limited accessibility of the seat to be measured. A further object of the present invention is to get a device and a method for measuring a seat, that allow the user to save time, allowing it to measure all parameters of interest by means of the same device. Said objects are fully achieved by the device and the method according to the present invention, which are characterized by the contents of the claims below. In particular, the device according to the present description is a device for measuring a seat, in particular a valve seat formed in a workpiece, in particular formed in a cylinder head of an internal combustion engine. The device is particularly targeted to measure a tapered portion of the valve seat. The device is elongate and define a longitudinal axis, that is it has a shape that is elongated along said longitudinal axis. The device comprises an inclined guide (for example, 45 degrees inclined) with respect to the longitudinal axis of the device and a slide slidably coupled to the guide to move (by translation) in a scanning direction defined by the guide and inclined with respect to the longitudinal axis. Preferably, the slide is preloaded with constant load by a leaf spring that eliminates backlash ensuring the reliability of measurement. The device also includes a sensor mounted on the slide and configured to detect a profile of the seat; or, for sensing at least one parameter relating to the profile of the seat. In particular, the sensor is intended to detect the profile of the tapered portion of the seat.

The sensor includes for example a movable feeler connected to a transducer of a known type, or is a contactless inductive or optical sensor. In any case, the present technical solution is not limited to the type of sensor used. The device also comprises, preferably, a processing unit connected to the sensor. The processing unit is configured to receive data detected by the sensor, acquire and process such data. Alternatively, the processing unit may be remote, instead of being on board of the device. Furthermore, the device comprises a rotary actuator, that defines a longitudinal rotation axis and is kinematically connected to the slide to move it along the guide. The rotary actuator is oriented substantially parallel to the longitudinal axis of the device, more specifically the longitudinal rotation axis and the longitudinal axis of the device are substantially parallel to each other. Preferably, the rotary actuator is aligned with (or coaxial to) the longitudinal axis of the device. The device also comprises a transmission assembly interposed between the rotary actuator and the slide, for transforming a rotary motion generated by the rotary actuator around a longitudinal rotation axis of the rotary actuator in a reciprocating linear motion of the slide along the scanning direction. Placing the rotary actuator out of line with the scanning direction renders the device particularly compact in the radial dimension, that is the device features an elongate and spindly shape along the longitudinal axis thereof, in particular at an ending zone of the device at which the sensor is arranged, thus facilitating the use even in situations of limited accessibility of the valve seat to be measured. The transmission assembly comprises a first transmission element, rotatable about the longitudinal rotation axis of the rotary actuator, and a second transmission element, configured to oscillate about an axis perpendicular to a plane parallel to the scanning direction and containing the longitudinal axis of the device.

Operationally, the rotary actuator is coupled to the first transmission element to cause a rotary or oscillatory rotary motion of the latter about the longitudinal rotation axis of the rotary actuator; while the second transmission element transmits a reciprocating linear motion to the slide. Preferably, the second transmission element is a rocker arm having a manoeuvring projection movably coupled to the slide (to define a joint). Preferably, the device comprises a lever having a first end kinematically connected to the first transmission element and a second end pivoted to the second transmission element. The lever serves as manoeuvring element of the second transmission element. The lever is arranged along an axis substantially parallel to the longitudinal axis of the device. This is functional to its elongate and spindly shape. The device also comprises a support structure, to which the rotary actuator is fixed and to which the second transmission element is pivoted. Two embodiments of the first transmission element of the transmission assembly are provided. In a first embodiment, the first transmission element is a pin eccentric with respect to the longitudinal rotation axis of the rotary actuator. In this case, preferably, the device, more specifically the transmission assembly, also comprises a bracket, that is configured to oscillate about an axis parallel to the oscillating axis of the second transmission element and movably coupled to the eccentric pin so as to receive an oscillating movement. The bracket is also pivoted to the first end of the lever (that as a consequence is kinematically connected to the first transmission element). The bracket is pivoted to the support structure. The supporting structure, the bracket, the lever and the second transmission element define an articulated quadrilateral, or articulating four-bar linkage.

The coupling between the eccentric pin and the bracket defines a joint in which the eccentric pin serves as a crank, and the pin is coupled to a slot of the bracket. The coupling of the eccentric pin to the groove of the bracket allows relative movement between pin and groove according to three degrees of freedom of movement: (i) along a direction along which the groove is arranged, (ii) toward and away from a the bottom wall of the groove, and (iii) by inclination of an axis (a longitudinal axis) of the eccentric pin with respect to a direction defined by side walls of the groove (this direction varies depending on the position of the eccentric pin, thus determining the oscillation of the bracket). In a second embodiment, the first transmission element is a worm screw. In this case, preferably, the transmission assembly comprises a cursor, connected to a free end of the worm screw so as to be longitudinally translatable with a straight-line reciprocating motion. The cursor is pivoted to the first end of the lever. Preferably, the cursor is guided to longitudinally slide along a portion of the support structure. Regardless of the embodiment of the first transmission element, the sensor mounted on the slide allows to measure parameters related to the angles, the straightness and length of the tapered portion of the seat. According to another aspect of the present description, it is also expected that the rotary actuator, the slide provided with the sensor, the guide and the transmission assembly be part of a movable unit rotatably mounted on a stationary body of the device. In particular, the device also comprises a motor housed in the stationary body and connected to the movable arm for causing it to rotate, preferably around the longitudinal axis of the device. This allows to measure also the runout of the tapered portion of the seat, so allowing to take all the necessary measures for the tapered portion of the seat, with the same device, saving time. Preferably, the movable unit also includes a stem that is longitudinally oriented and protrudes from one end of the device opposite to the stationary body. This allows to measure, with the same device, also the parameters of a guide hole of the valve. Moreover, preferably, the movable unit comprises a hollow cylinder, interposed between the stationary body and the stem. The hollow cylinder internally houses the rotary actuator and the transmission assembly. This makes the device particularly robust, despite its elongate and spindly shape. Preferably, the stem is coaxial to the axis of rotation of the movable unit and to the longitudinal rotation axis of the rotary actuator and to an axis of the hollow cylinder. The present description also provides a method for measuring a valve seat formed in a piece, the valve seat defining a seat axis, by means of a device elongate along a longitudinal axis and having a sensor configured to measure a parameter related to a profile of the valve seat, and a processing unit for receiving data detected by the sensor. The method comprises a preliminary step of positioning the device alongside the seat to be measured with its longitudinal axis aligned to the seat axis. Furthermore, the method comprises a step of moving the sensor, by means of a slide, by translation in a scanning direction that is inclined with respect to said longitudinal axis.

The displacement of the sensor along the scanning direction includes a generation of a rotary motion around the longitudinal axis of the device by means of a rotary actuator and a transformation of said rotary motion into a reciprocating linear motion of the slide along the scanning direction, by means of a transmission assembly that is kinematically interposed between the rotary actuator and the slide. Preferably, the rotary motion around said longitudinal axis is transformed into an oscillatory motion of at least one second transmission element of the transmission assembly around an axis perpendicular to a plane parallel to the scanning direction and containing the longitudinal axis of the device. As regards the transformation of rotary motion about the longitudinal axis in said oscillatory motion, there are provided two alternative embodiments (corresponding to the embodiments described above in connection with the device). According to the first embodiment, the transformation of the rotary motion about the longitudinal axis into said oscillatory motion is performed by an interaction between a pin that is eccentric with respect to the longitudinal rotation axis of the rotary actuator and a bracket that is constrained to oscillate about an axis perpendicular to a plane parallel to the scanning direction and containing the longitudinal rotation axis of the rotary actuator. In the second embodiment, the transformation of the rotary motion about the longitudinal axis in said oscillatory motion is realized by an interaction between a worm screw and a cursor that is constrained to translate along the longitudinal rotation axis of the rotary actuator. The cursor is kinematically coupled to a second transmission element configured to oscillate about an axis perpendicular to a plane parallel to the scanning direction and containing the longitudinal axis of the device. In both embodiments, the method also includes a step of rotation, about said longitudinal axis of the device, of a movable unit comprising the slide, the sensor and the rotary actuator.

In the present description it is defined also a transmission assembly for translating a sensor along a scanning direction in a device for measuring a valve seat formed in a piece, wherein the device has an elongate shape and defines a longitudinal axis, that is the device is elongated along the longitudinal axis, and the scanning direction is inclined (for example, 45 degrees inclined) with respect to said longitudinal axis. The present description also refers to a method for translating a sensor along a scanning direction in a device for measuring a valve seat formed in a piece, wherein the device is elongated along a longitudinal axis, that is it has an elongate shape that defines the longitudinal axis, and the scanning direction is inclined (for example 45 degrees inclined, or other angle, for example comprised between 20 and 80 degrees) with respect to said longitudinal axis.

BRIEF DESCRIPTION OF THE DRAWINGS

This and other characteristics will emerge more clearly from the following description of a preferred embodiment, illustrated by way of non limiting example in the accompanying drawing tables, in which:

FIG. 1a shows the device of FIG. 1, in exploded view;

FIG. 2 illustrates, in perspective view, a detail of the device of FIG. 1, according to a first embodiment of the invention and with an eccentric pin in a first operating position;

FIG. 2a shows the detail of FIG. 2, according to a different perspective;

FIG. 3 shows the detail of FIG. 2, in front view;

FIG. 4 shows the detail of FIG. 2, in a side view;

FIG. 4a illustrates, within the detail of FIG. 2, a plan view of the position of the eccentric pin;

FIG. 19 illustrates the detail of FIG. 17, in a front view;

FIG. 20 illustrates the detail of FIG. 17, in side view;

FIG. 20a illustrates, within the detail of FIG. 17, a plan view of a position of the eccentric pin;

BEST MODE OF CARRYING OUT THE INVENTION

Figure 1:
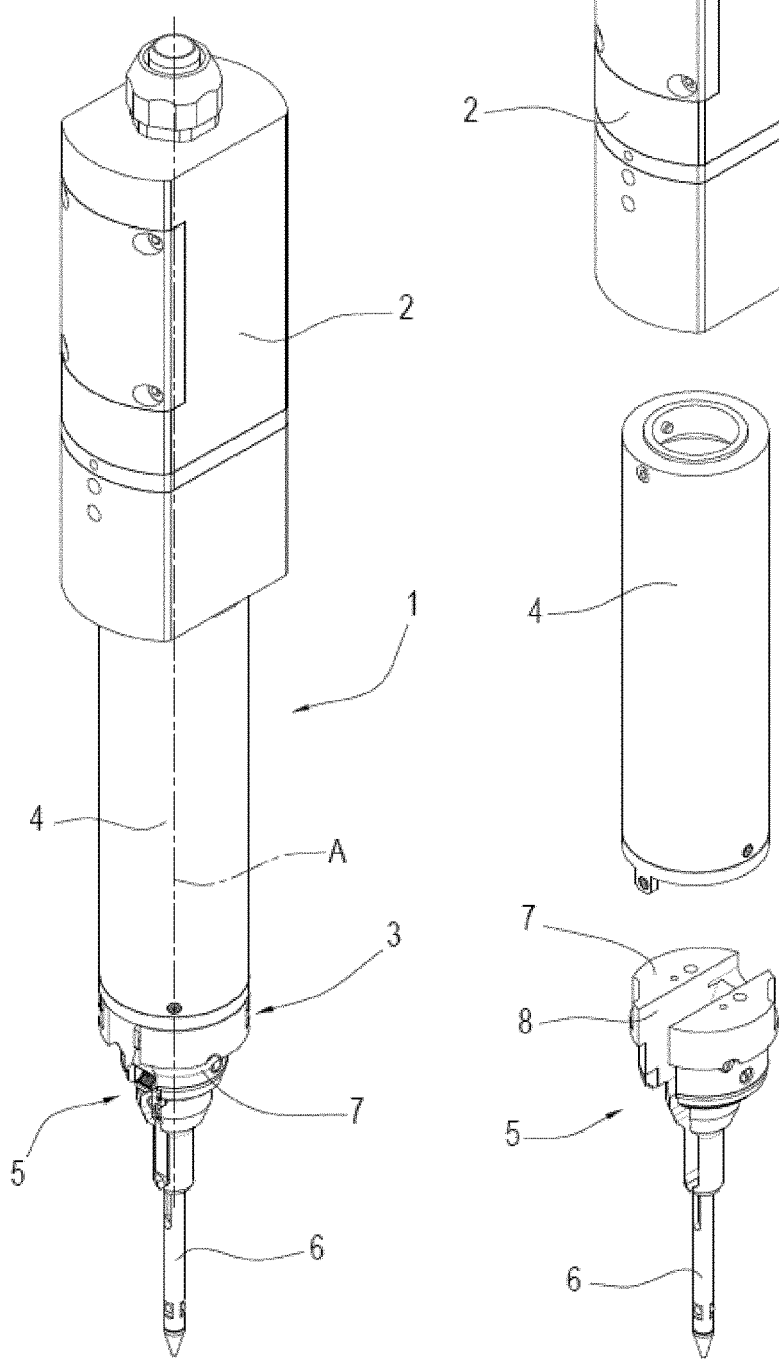
FIG. 1 shows a device according to the present invention, in perspective view.
Figure 5:
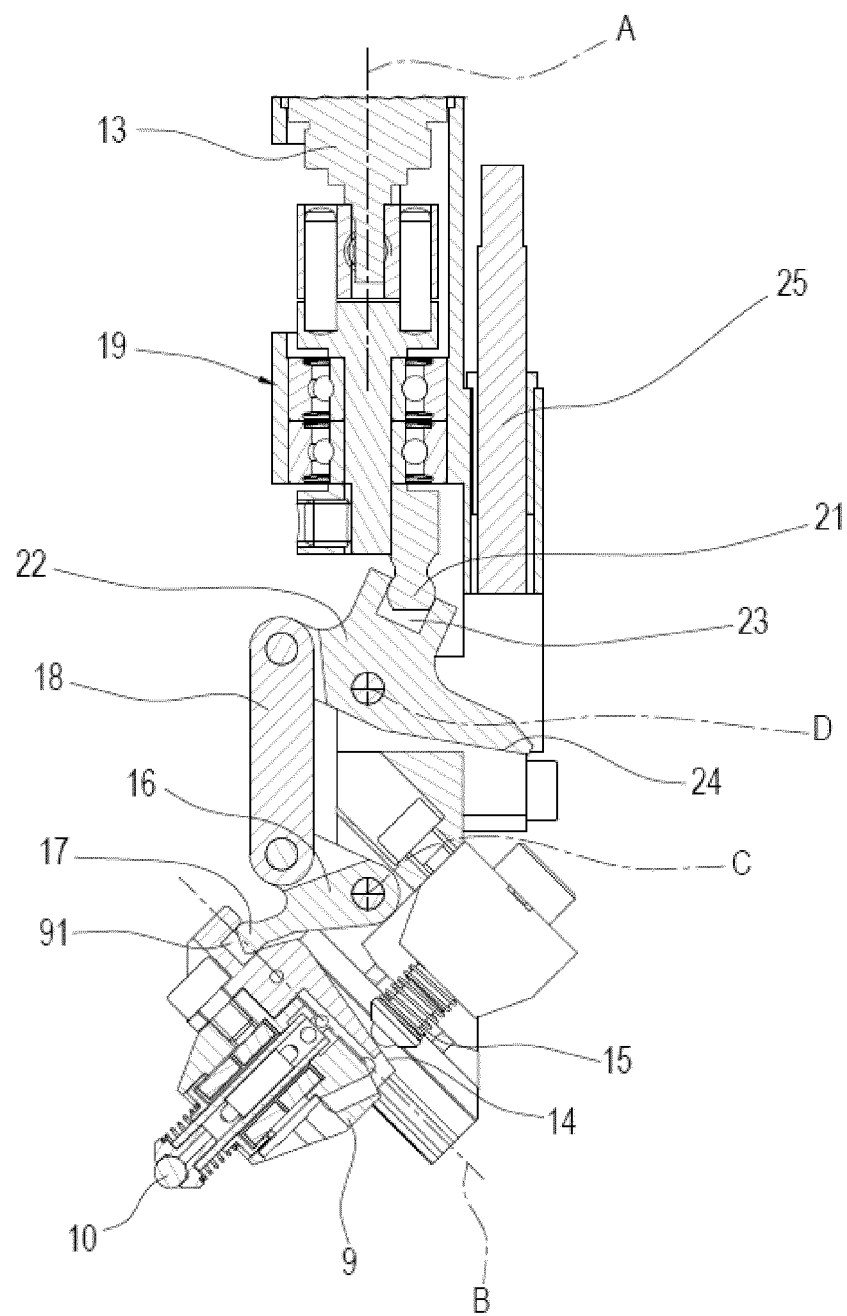
FIG. 5 shows the detail of FIG. 2, in sectional view according to the plane indicated V-V in FIG. 3.
Figure 6:
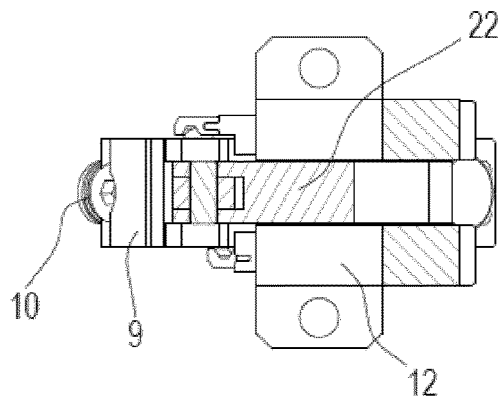
FIG. 6 shows the detail of FIG. 2, in sectional view according to the plane indicated VI-VI in FIG. 4.
Figure 7:
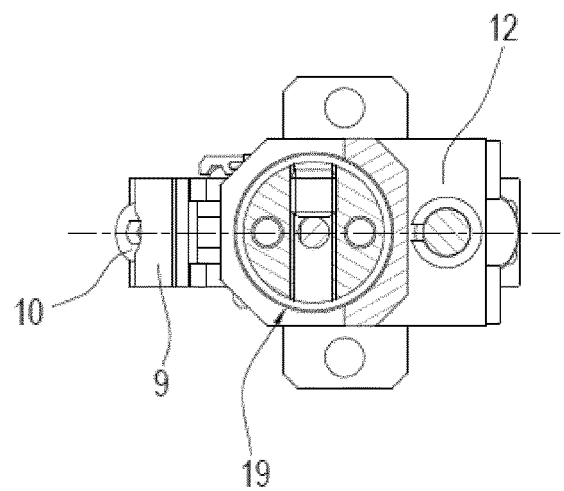
FIG. 7 shows the detail of FIG. 2, in sectional view according to the plane indicated VII-VII in FIG. 4.
Figure 8:
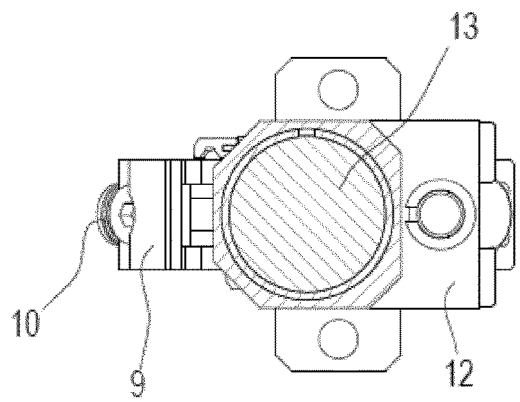
FIG. 8 shows the detail of FIG. 2, in sectional view according to the plane indicated VIII-VIII in FIG. 4.
Figure 9:
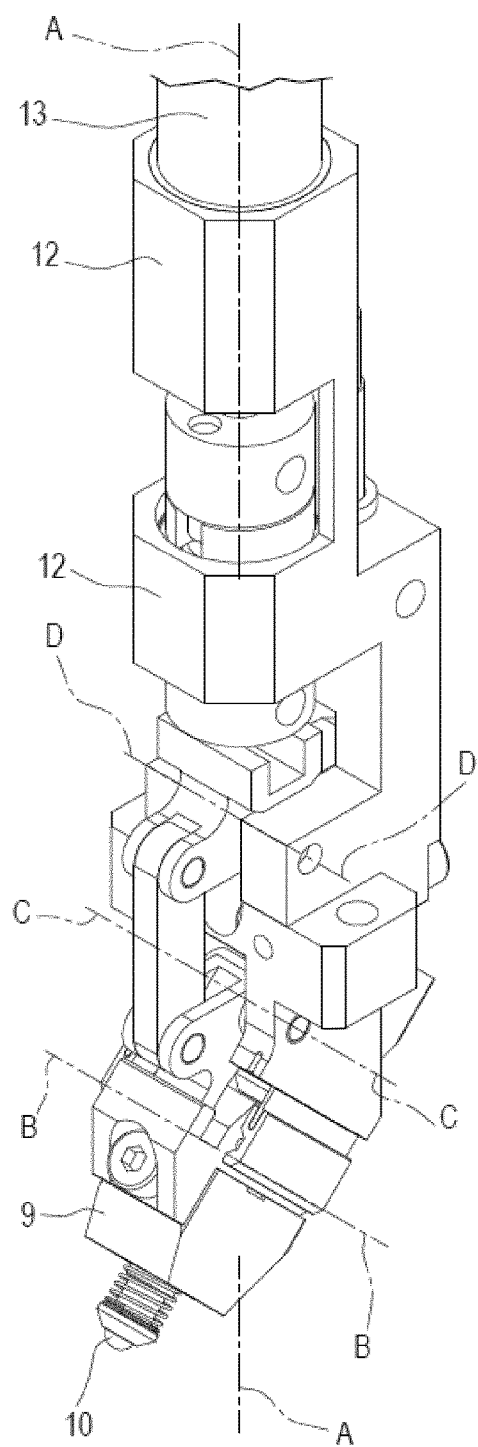
FIG. 9 shows, in perspective view, the detail of FIG. 2, with the eccentric pin in a second operating position.
Figure 10:
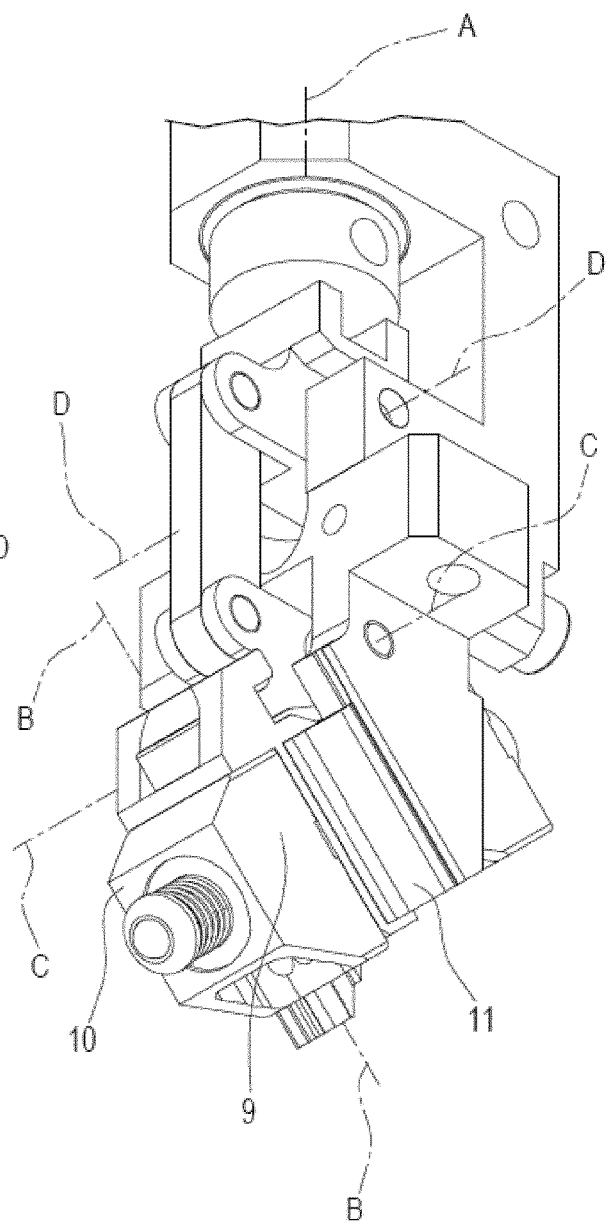
FIG. 10 illustrates the detail of FIG. 9, according to a different perspective.
Figure 11:
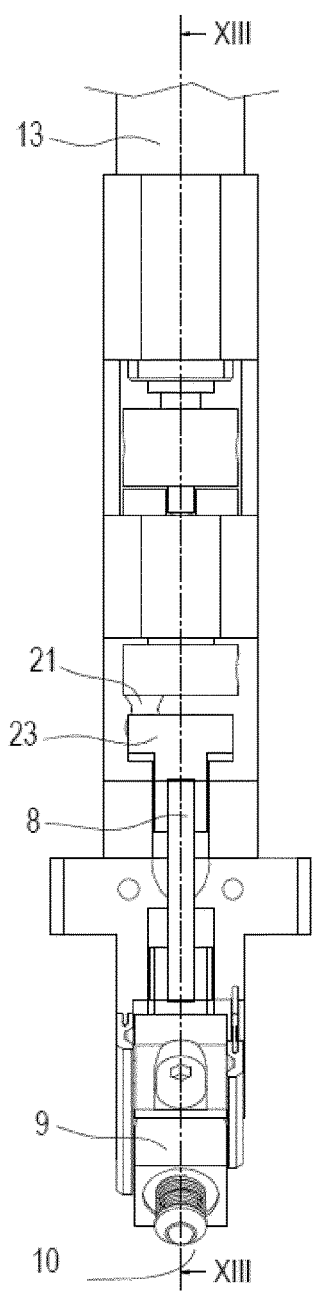
FIG. 11 shows the detail of FIG. 9, in front view.
Figure 12:
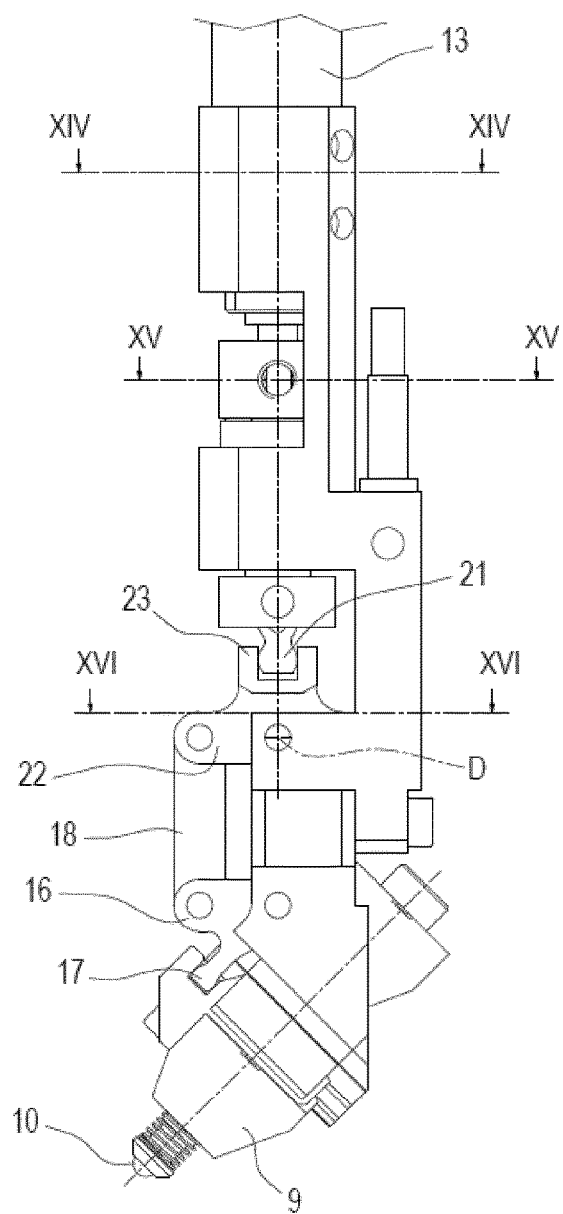
FIG. 12 illustrates the detail of FIG. 9, in a side view.
Figure 12A:
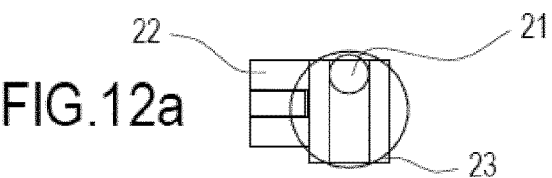
FIG. 12a illustrates, within the detail of FIG. 9, a plan view of the position of the eccentric pin.
Figure 13:
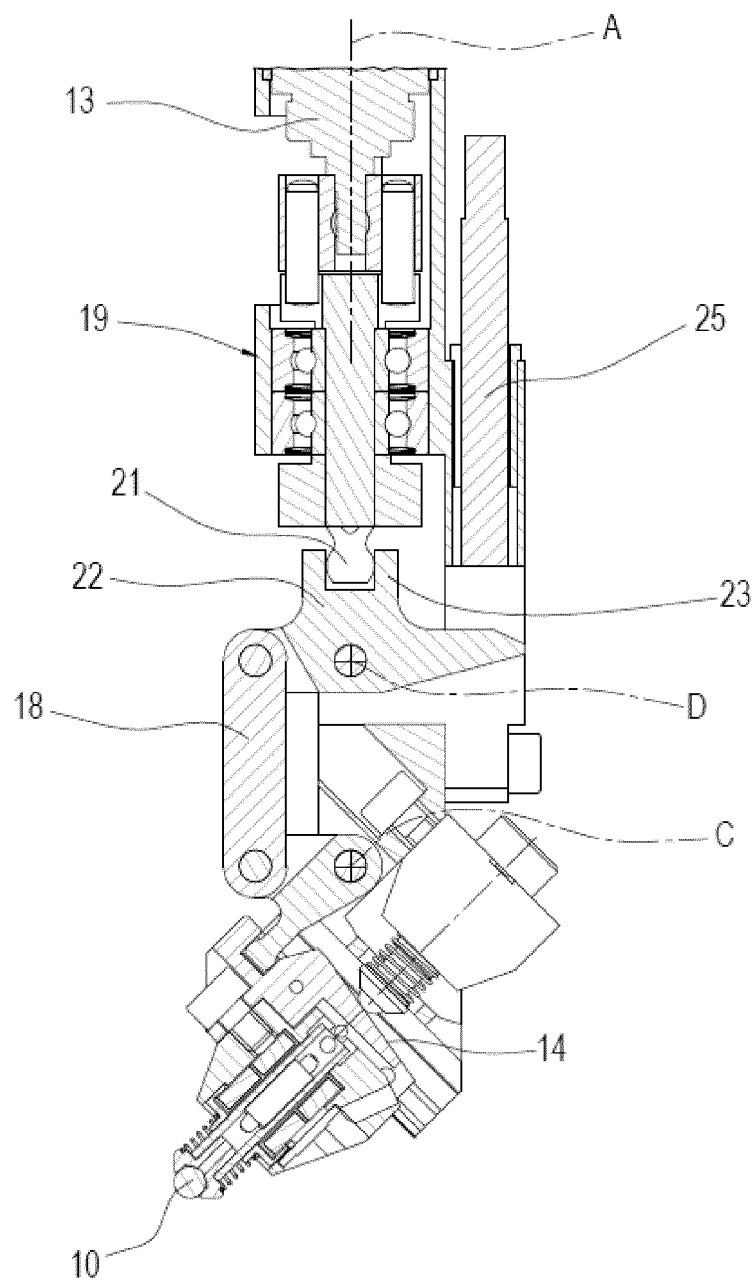
FIG. 13 illustrates the detail of FIG. 9, in sectional view according to the plane indicated XIII-XIII in FIG. 11.
Figure 14:
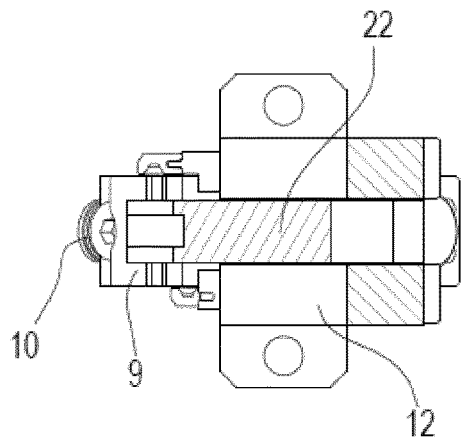
FIG. 14 illustrates the detail of FIG. 9, in sectional view along the plane indicated XIV-XIV in FIG. 12.
Figure 15:
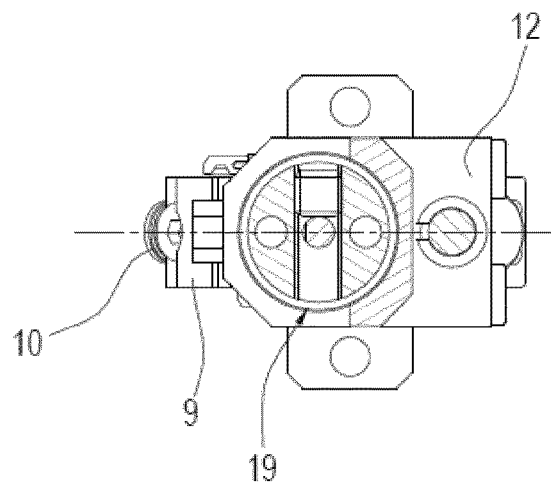
FIG. 15 illustrates the detail of FIG. 9, in sectional view according to the plane indicated XV-XV in FIG. 12.
Figure 16:
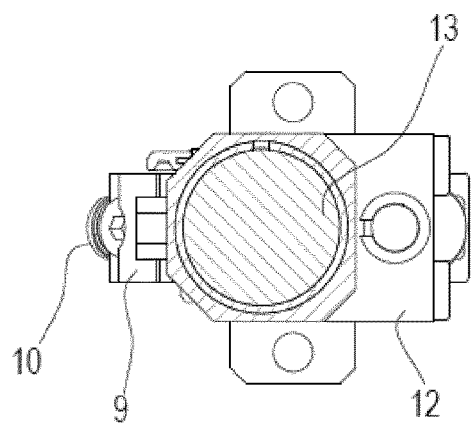
FIG. 16 shows the detail of FIG. 2, in sectional view along the plane indicated XVI-XVI in FIG. 12.
Figure 17:
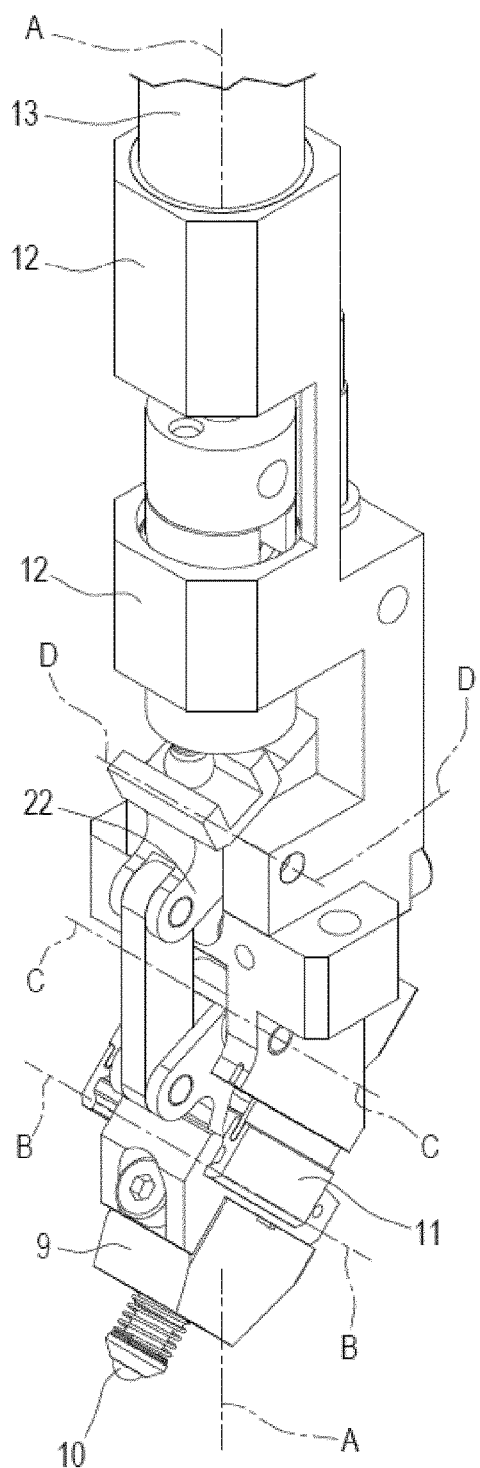
FIG. 17 illustrates, in perspective view, the detail of FIG. 2, with the eccentric pin in a third operating position.
Figure 18:
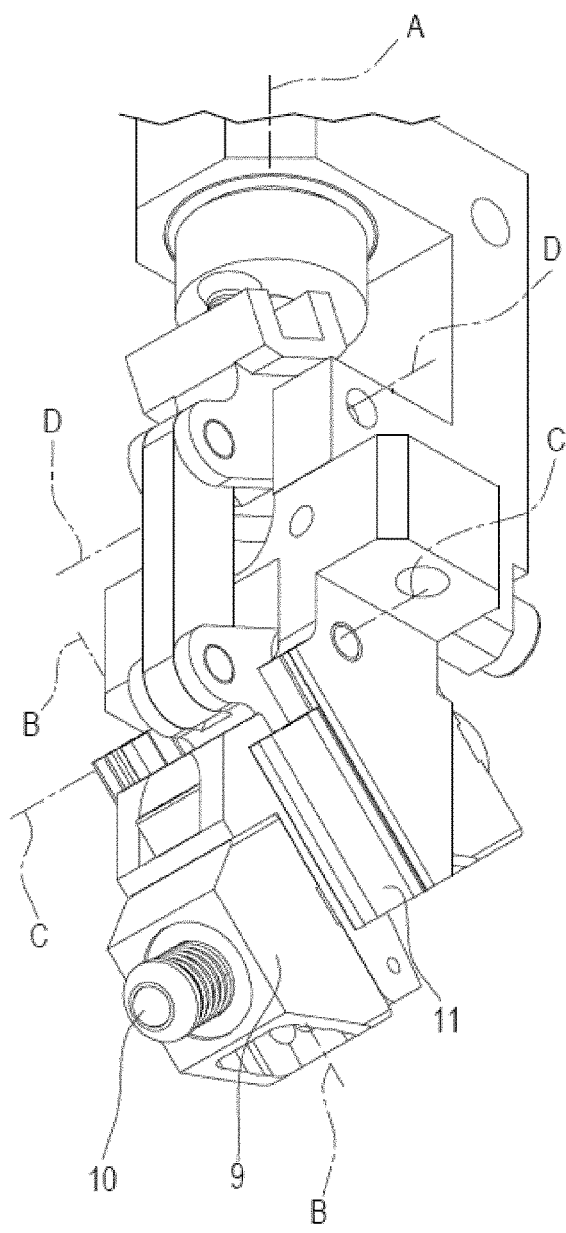
FIG. 18 illustrates the detail of FIG. 17, according to a different perspective.
Figure 21:
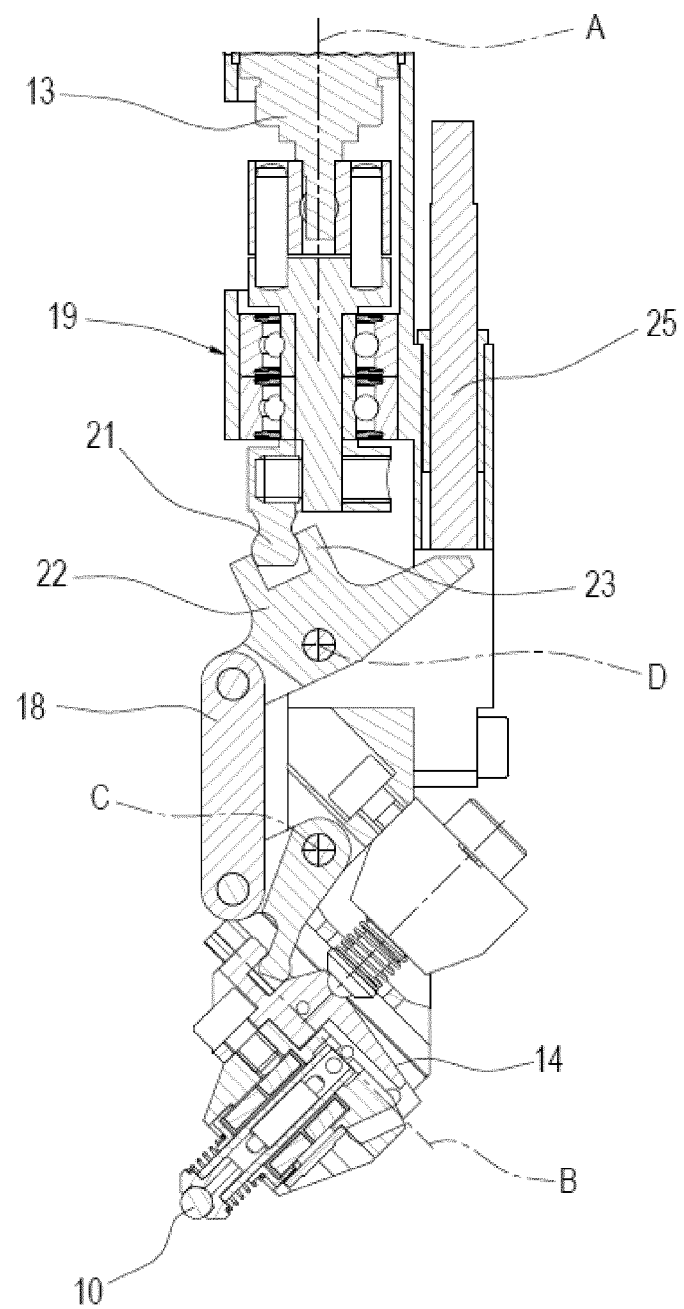
FIG. 21 illustrates the detail of FIG. 17, in sectional view along the plane indicated XXI-XXI in FIG. 19.
Figure 22:
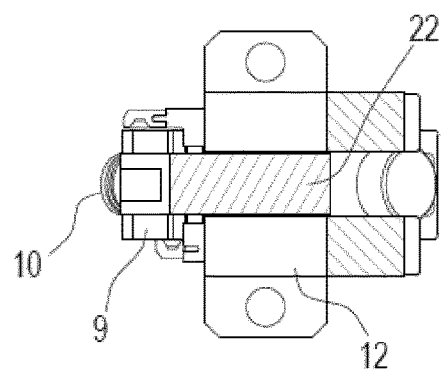
FIG. 22 illustrates the detail of FIG. 17, in sectional view along the plane indicated XXII-XXII in FIG. 20.
Figure 23:
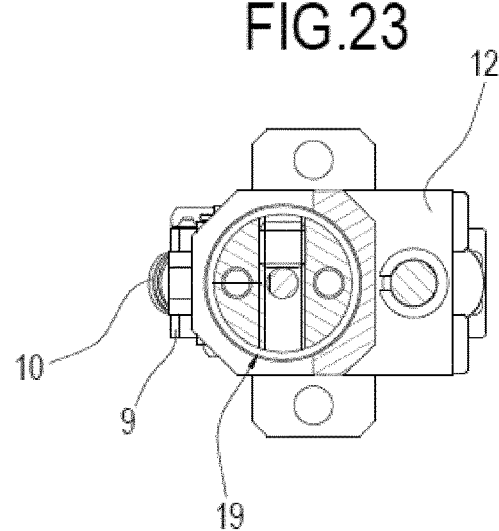
FIG. 23 illustrates the detail of FIG. 17, in sectional view along the plane indicated XXIII-XXIII in FIG. 20.
Figure 24:
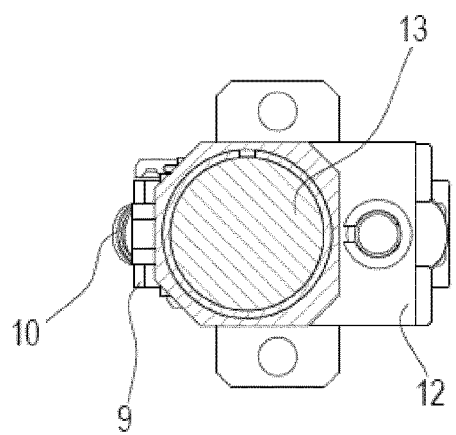
FIG. 24 illustrates the detail of FIG. 17, in sectional view according to the plane indicated XXIV-XXIV in FIG. 20.

In the figures, the numeral 1 indicates a device for measuring a valve seat formed in a piece and defining a seat axis. The device 1 is elongated along a longitudinal axis A, that is it has an elongate shape defining the longitudinal axis A. In the example illustrated, the device 1 comprises a stationary body 2, which houses a motor (not shown, of a type in itself known, for example, a brushless motor) is housed. The device 1 also comprises a movable unit 3, coupled to the stationary body 2 so as to rotate about the longitudinal axis A; the movable unit 3 is placed in rotation by said motor. Therefore, during the rotation of the movable unit 3, the body 2 remains stationary. The movable unit 3 also includes a hollow cylinder 4 and a ferrule 5. The ferrule comprises a stem 6 and a connection element 7, the latter being adapted to be coupled to the hollow cylinder 4. The stem 6 is protruding from the connection element 7 and extends along the longitudinal axis A. The connection element 7 defines a groove 8; the groove 8 extends along a plane passing through the longitudinal axis A of the device 1. The device 1 also includes a measuring unit adapted in particular for measuring a tapered portion of the seat to be measured. Said measuring unit is housed inside the hollow cylinder 4 and the groove 8 of the connection element 7. Therefore, the measuring units forms part of the movable unit 3. Such a measuring unit is the main subject of the present invention and of the description that follows. The device (i.e. the measuring unit; this expression here in brackets will be omitted below for brevity) comprises a guide 11, more specifically an inclined guide 11, and a slide 9 which carries a sensor 10.

The sensor (that is a contact probe in the embodiment shown in the drawings) is configured to measure a parameter related to a profile of the seat. Preferably, the sensor 10 is connected to a processing unit (not shown, of a type in itself known, for example comprising a processor, or a circuit board or other element configured to receive and process data and/or signals). The slide 9 is slidably coupled to the guide 11 to translate in a scanning direction, or scanning axis, B inclined with respect to the longitudinal axis A. The scanning axis B is operatively arranged within the groove 8 of the connection element 7. The guide 11 is fixed to a support structure 12 (of the measuring unit). The device also includes a rotary actuator (for example, a brushless motor) that is connected to the support structure 12 and defines a longitudinal rotation axis. The rotary actuator 13 is oriented substantially parallel to the longitudinal axis A of the device 1, more specifically the longitudinal rotation axis of the rotary actuator 13 is substantially parallel, and preferably aligned to, the longitudinal axis A of the device. Furthermore, the device 1 comprises a transmission assembly interposed (i.e. kinematically interconnected) between the rotary actuator 13 and the slide 9, for transforming a rotary motion about the longitudinal axis A of the actuator in a reciprocating linear motion of the slide along the scanning direction B. The slide 9 defines, in an inner portion opposite to that from which the sensor 10 protrudes, an abutment wall 14 inclined with respect to the scanning direction B. The abutment wall 14 is cooperating with an auxiliary sensor 15 (for example with a retractable feeler of the sensor 15, operatively active against the abutment wall 14, like a cam follower cooperating with a cam), to make available a parameter representative of a position of the slide 9 along the guide 11. In this way, by using the pairs of signals of the sensor 10 and the auxiliary sensor 15, the latter being preferably connected to the processing unit, it is possible to reconstruct the profile of the controlled seat.

Therefore, the processing unit is adapted to receive a signal from the auxiliary sensor 15.

Therefore, the processing unit is programmed to acquire, in a plurality of instants of acquisition, a corresponding plurality of pairs of values, wherein each pair comprises a value of the signal detected by the sensor 10 and a value of the signal detected by the auxiliary sensor 15. In addition, the processing unit is connected to the rotary actuator 13 for driving it. In an exemplary embodiment, the processing unit is programmed to drive the rotary actuator 13 as a function of a predetermined (preset) displacement to the sensor 10 along the scanning axis B. According to another aspect, or according to another possible embodiment, the processing unit is programmed to use the signal received from the auxiliary sensor 15 as a control signal, for driving the rotary actuator 13. In this case, the processing unit is programmed for processing the control signal received from the auxiliary sensor 15 and for generating a driving signal, for controlling the rotary actuator 13 as a function of said control signal. Preferably, the processing unit is also connected to the motor for rotating the movable unit 3. The processing unit is programmed to generate an additional drive signal for controlling said motor. In an embodiment, the processing unit is programmed to generate said additional drive signal for said motor as a function of said control signal and / or the signal generated by the sensor 10. The device 1 (in particular, the transmission assembly) comprises a first transmission element, rotatable about the longitudinal rotation axis of the rotary actuator 13 (preferably coincident with the longitudinal axis A of the device 1). Furthermore, the device 1 (in particular, the transmission assembly) comprises a second transmission element, configured to oscillate about an axis C perpendicular to a plane, wherein said plane is parallel to the scanning direction B, and contains the longitudinal axis A of the device (i.e. the longitudinal rotation axis of the rotary actuator 13).

Figure 25:
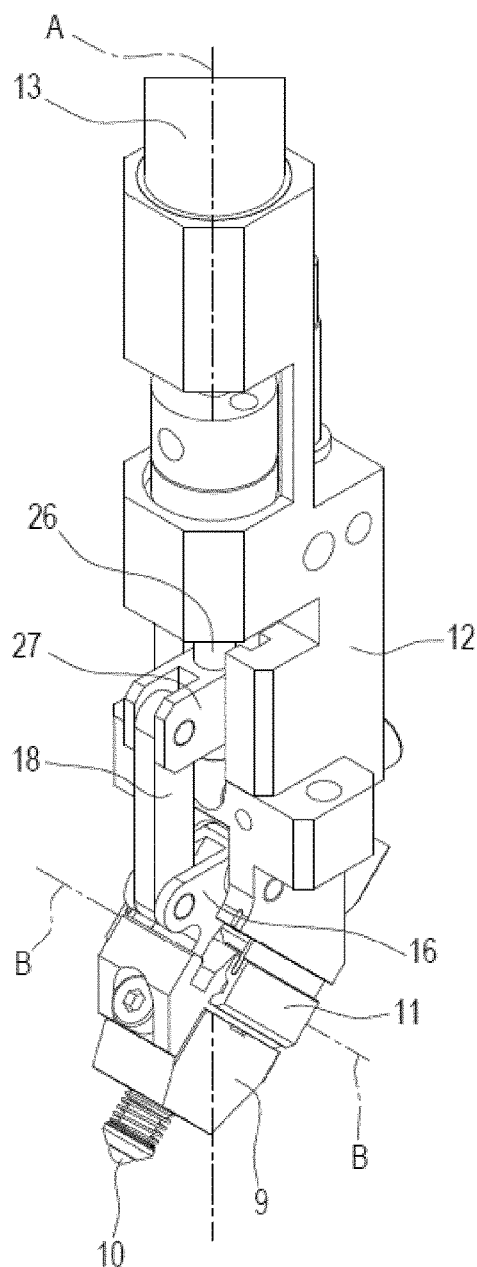
FIG. 25 illustrates, in perspective view, the detail of FIG. 2, according to a second embodiment.
Figure 26:
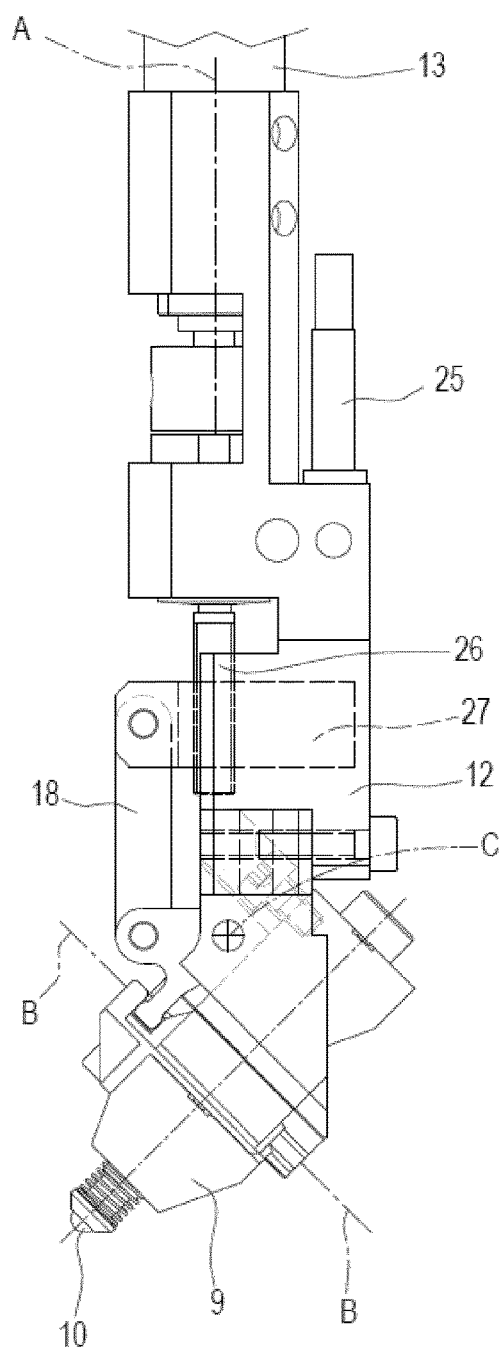
FIG. 26 illustrates, in side view, partly transparent, of the detail of FIG. 25.

In the examples illustrated, the second transmission element is a rocker arm 16 pivoted to the support structure to swing about the axis C. The rocker arm 16 has a manoeuvring projection 17 movably coupled to the slide. In particular, the manoeuvring projection 17 is operatively and movably inserted in a recess 91 of the slide 9. Preferably, the manoeuvring projection 17 is shaped as a hub; the manoeuvring protrusion 17 has one end at least partially spherical. The manoeuvring protrusion 17 is movably engaged in the recess 91 of the slide 9 to be able to move relative thereto for rotation (due to the oscillation), and varying a distance with respect to a bottom wall of the recess 91. The roles of male and female in the coupling between the manoeuvring projection 17 and the slide 9 can be mutually exchanged. Furthermore, in the illustrated examples, the device 1 (in particular, the transmission assembly) includes a lever 18 intended to maneuver the rocker arm 16 in its oscillatory movement. The lever 18 is elongate along an axis and has a first and a second end. The first end of the lever 18 is kinematically connected to the first transmission element and the second end of the lever 18 is pivoted to the rocker arm 16. It is observed that the lever axis 18 is arranged substantially parallel to the longitudinal axis A of the device. Preferably, the first transmission element is connected to the rotary actuator 13 by means of a joint 19 that is preferably supported by bearings 20. This increases the accuracy of the device and contributes to get it in an elongated shape along the longitudinal axis A. As regards the first transmission element, the present description presents two examples of embodiment; the first example is shown in FIG. 2 (and in the figures related to it), the second example is shown in FIGS. 25 and 26.

In the first embodiment, the first transmission element is a pin 21 eccentric with respect to the longitudinal rotation axis of the rotary actuator 13. In addition, the transmission assembly comprises a bracket 22 that is configured to oscillate about an axis D parallel to the oscillation axis C of the rocker arm 16. Preferably, the axis D intersects the longitudinal axis A of the device. The bracket 22 is hinged to the support structure 12 to swing about the axis D.

The bracket 22 defines a slot 23 that receives the eccentric pin 21 and is movably coupled to the latter so as to receive the oscillating movement. More specifically, displacements of the pin 21 along a circular path about the longitudinal rotation axis of the rotary actuator 13 (that is, according to the preferred embodiment, about the longitudinal axis A of the device 1) cause oscillating movements of the bracket 22. The first end of the lever 18 is pivoted to the bracket 22. Preferably, the bracket 22 comprises a finger 24 configured to cooperate with a reference sensor 25 (for example an inductive sensor) for defining an initial reference position for the rotary actuator 13. Preferably, the reference sensor 25 is oriented along an axis parallel to the longitudinal axis A of the device 1. Preferably, the axis D about which the bracket 22 oscillates is interposed between the finger 24 and the portion of the bracket 22 that is pivoted to the lever 18, whereby, when the lever 18 moves longitudinally in one direction, the finger 24 moves longitudinally in the opposite direction. Operatively, moving the eccentric pin 21 by rotating it about the longitudinal rotation axis of the rotary actuator 13, the bracket 22 is swung; the bracket 22 thus moves the lever 18 along a substantially longitudinal direction (the lever 18 constitutes one side of an articulated quadrilateral or four-bar linkage, together with the bracket 22, the support structure 12 and the rocker arm 16), alternately in one direction and in the other; thus, the lever 18 causes the rocker arm 16 to oscillate, and the latter, through the manoeuvring projection 17, causes the slide 9 to translate along the guide 11.

In the second embodiment, the first transmission element is a worm screw 26. In addition, the transmission assembly comprises a cursor 27, connected to a free end of the worm screw 26 so as to be longitudinally translatable with rectilinear motion (in both directions, as a function of a direction of rotation of the rotary actuator 13). Preferably, the cursor 27 is guided on the support structure 12. Preferably, the cursor 27, in its straight-line reciprocating motion, is cooperating with the reference sensor 25 for defining the initial reference position for the rotary actuator 13. The second end of the lever 18 is pivoted to the cursor 27.

Operationally, the worm screw 26 is caused to turn about its axis and, as a consequence, the cursor 27 longitudinally translates and pulls the lever 18 in its straight-line reciprocating motion. Thus, the lever 18 causes the rocker arm 16 to oscillate, and the latter, through the manoeuvring projection 17, causes the slide 9 to translate along the guide 11. Contrary to what happens in the first embodiment, the sense of rotation of the actuator 13 must be periodically inverted in order to cause the oscillation of the rocker arm 16. Therefore, the invention renders available a method to move the sensor 10 for translation along the scanning direction B, as part of a method for measuring a valve seat formed in a piece. This method comprises a step of causing a rotary motion, more specifically a rotary motion of the first transmission element, about the longitudinal rotation axis—that is parallel to and preferably aligned to said longitudinal axis A—by means of the rotary actuator 13, and a step of transforming said rotary motion into a reciprocating linear motion of the slide 9 along the scanning direction B. Preferably, said rotary motion around said longitudinal axis A is first converted into an oscillatory motion around an axis C perpendicular to a plane parallel to the scanning direction B and containing the longitudinal rotation axis of the rotary actuator 13. According to the first embodiment, the transformation of the rotary motion about the longitudinal rotation axis, i. e. the longitudinal axis A, into said oscillatory motion is achieved by means of the interaction of the eccentric pin 21 with the bracket 22, the latter being constrained to oscillate about an axis D perpendicular to a plane parallel to the scanning direction and containing the longitudinal rotation axis of the rotary actuator, wherein the axis D is parallel to the oscillation axis C of the rocker arm 16. In the second embodiment, the transformation of the rotary motion into the oscillatory motion is achieved by means of the interaction of the worm screw 26 and the cursor 27, the latter being constrained to translate along the longitudinal rotation axis of the rotary actuator 13, in which the cursor 27 is kinematically coupled to the rocker arm 16 oscillating about the axis C by means of the lever 18. In addition, there is also a rotation step of the movable unit 3 about said longitudinal axis A of the device 1, the movable unit 3 comprising the slide 9, the sensor 10, the rotary actuator 13 and the transmission assembly.

The invention claimed is:

1. A device for measuring a valve seat in a workpiece, wherein the device is elongate along a longitudinal axis and comprises:
    a slide and a guide, the slide being slidaby coupled to the guide for translating in a scanning direction inclined with respect to said longitudinal axis;
    a sensor mounted on the slide and configured to measure a parameter relative to a profile of the valve seat;
    a processing unit connected to the sensor;
    a rotary actuator, defining a longitudinal rotation axis, kinematically connected to the slide for moving the slide along the guide;
    wherein said longitudinal rotation axis of the rotary actuator is substantially parallel to the longitudinal axis of the device and in that the device comprises a transmission assembly interposed between the rotary actuator and the slide, so as to transform a rotary motion about said longitudinal rotation axis of the rotary actuator into a reciprocating linear motion of the slide along the scanning direction.

2. The device according to claim 1, wherein the transmission assembly comprises:
    a first transmission element, rotatable about the longitudinal rotation axis of the rotary actuator;
    a second transmission element, configured to oscillate about an axis perpendicular to a plane parallel to the scanning direction and containing the longitudinal axis of the device.

3. The device according to claim 2, wherein the transmission assembly comprises a lever having a first end kinematically connected to the first transmission element and a second end pivoted to the second transmission element, wherein the lever is arranged along an axis substantially parallel to the longitudinal axis of the device.

4. The device according to claim 3, wherein the second transmission element is a rocker arm having a manoeuvring projection movably coupled to the slide.

5. The device according to claim 3, wherein the first transmission element is a pin eccentric with respect to the longitudinal rotation axis of the rotary actuator.

6. The device according to claim 5, wherein the transmission assembly comprises a bracket, configured to oscillate about an axis parallel to the oscillating axis of the second transmission element and movably coupled to the eccentric pin so as to receive an oscillating movement, said first end of the lever being pivoted to the bracket.

7. The device according to claim 6, further including a reference sensor, wherein the bracket comprises a finger configured to cooperate with the reference sensor for defining an initial reference position for the rotary actuator.

8. The device according to claim 3, wherein the first transmission element is a worm screw.

9. The device according to claim 8, wherein the transmission assembly comprises a cursor, connected to a free end of the worn screw so as to be longitudinally translatable with a straight-line reciprocating motion, said first end of the lever being pivoted to the cursor.

10. The device according to claim 1, comprising:
    a stationary body;
    a movable unit coupled to the stationary body for rotating about said longitudinal axis of the device;
    a motor, for rotating the movable unit with respect to the stationary body, wherein the movable unit comprises the slide, the sensor, the rotary actuator and the transmission assembly.

11. A method for measuring a valve seat in a workpiece, the valve seat defining a seat axis, comprising the following steps:
    preparing a device elongate along a longitudinal axis and having a sensor configured to measure a parameter relative to a profile of the valve seat and a processing unit for receiving data detected by the sensor;
    positioning the device alongside the seat with the longitudinal axis aligned to the seat axis;
    moving the sensor mounted on a slide by translation in a scanning direction inclined with respect to the longitudinal axis of the device;
    wherein said movement of the sensor comprises the following steps:
    causing a rotary motion of a first transmission element about a longitudinal rotation axis that is parallel to said longitudinal axis by means of a rotary actuator;
    transforming said rotary motion of the first transmission element into a reciprocating linear motion of the slide along the scanning direction.

12. The method according to claim 11, wherein the rotary motion about said longitudinal rotation axis is transformed into an oscillating motion about an axis perpendicular to a plane parallel to the scanning direction and containing the longitudinal axis of the device.

13. The method according to claim 12, wherein said step of transforming the rotary motion about the longitudinal rotation axis into said oscillating motion includes an interaction of a pin, eccentric with respect to the longitudinal rotation axis of the rotary actuator, and a bracket constrained to oscillate about an axis perpendicular to a plane parallel to the scanning direction and containing the longitudinal axis.

14. The method according to claim 12, wherein said step of transforming the rotary motion about the longitudinal rotation axis into the oscillating motion includes an interaction of a worm screw and a cursor constrained to translate along the longitudinal rotation axis of the rotary actuator, wherein the cursor is kinematically coupled to a second transmission element oscillating about an axis perpendicular to a plane parallel to the scanning direction and containing the longitudinal axis.

15. The method according to claim 11, further comprising a step of rotating, about said longitudinal axis of the device, a movable unit comprising the slide, the sensor and the rotary actuator.

* * * * *